US011955133B2

(12) United States Patent
Robben et al.

(10) Patent No.: US 11,955,133 B2
(45) Date of Patent: Apr. 9, 2024

(54) AUDIO SIGNAL PROCESSING METHOD AND SYSTEM FOR NOISE MITIGATION OF A VOICE SIGNAL MEASURED BY AN AUDIO SENSOR IN AN EAR CANAL OF A USER

(71) Applicant: Analog Devices International Unlimited Company, Limerick (IE)

(72) Inventors: Stijn Robben, Boutersem (BE); Charles Fox, Brussels (BE)

(73) Assignee: Analog Devices International Unlimited Company, Limerick (IE)

( * ) Notice: Subject to any disclaimer, the term of this patent is extended or adjusted under 35 U.S.C. 154(b) by 24 days.

(21) Appl. No.: 17/841,440

(22) Filed: Jun. 15, 2022

(65) Prior Publication Data

US 2023/0410827 A1 Dec. 21, 2023

(51) Int. Cl.
*G10L 21/0232* (2013.01)
*G10L 25/78* (2013.01)
(Continued)

(52) U.S. Cl.
CPC .......... *G10L 21/0232* (2013.01); *G10L 25/78* (2013.01); *H04R 5/027* (2013.01);
(Continued)

(58) Field of Classification Search
None
See application file for complete search history.

(56) References Cited

U.S. PATENT DOCUMENTS 9,812,149 B2 * 11/2017 Yen .................... G10L 21/0216
10,327,071 B2 * 6/2019 Pedersen ................. H04R 3/04
(Continued)

FOREIGN PATENT DOCUMENTS

WO WO-2021260457 A1 12/2021

OTHER PUBLICATIONS

"International Application Serial No. PCT/EP2023/066134, International Search Report dated Aug. 1, 2023", 5 pgs.
(Continued)

*Primary Examiner* — Paul W Huber
(74) *Attorney, Agent, or Firm* — Schwegman Lundberg & Woessner, P.A.

(57) ABSTRACT

Disclosed is an audio signal processing method implemented by an audio system with internal and external sensors. The internal sensor measures acoustic signals propogating internally to a user's head. The external sensor measures acoustic signals propagating externally to the user's head. The method includes: producing first and second audio signals by measuring simultaneously acoustic signals reaching the internal and external sensors, respectively; filtering the second audio signal by a noise matching filter matching a second noise signal affecting the second audio signal with a first noise signal affecting the first audio signal, wherein the first noise signal and the second noise signal correspond to a same noise acoustic signal originating outside the user's head and measured by respectively the internal and external sensors, thereby producing a filtered second audio signal including a matched second noise signal; and mixing the filtered second audio signal and the first audio signal.

21 Claims, 4 Drawing Sheets

(51) Int. Cl.

| | |
|---|---|
| ***H04R 5/027*** | (2006.01) |
| ***H04R 5/04*** | (2006.01) |
| *G10L 21/0208* | (2013.01) |
| *H04R 1/10* | (2006.01) |

(52) U.S. Cl.
CPC ...... *H04R 5/04* (2013.01); *G10L 2021/02082* (2013.01); *H04R 1/10* (2013.01)

(56) References Cited

U.S. PATENT DOCUMENTS

| | | | | |
|---|---|---|---|---|
| 10,582,293 | B2 * | 3/2020 | Yamkovoy | G10K 11/178 |
| 11,743,662 | B2 * | 8/2023 | Oosugi | H04R 1/1083<br>381/312 |
| 2010/0280824 | A1 | 11/2010 | Petit et al. | |
| 2012/0148063 | A1 | 6/2012 | Kajimura et al. | |
| 2013/0024194 | A1 | 1/2013 | Zhao et al. | |
| 2018/0336911 | A1 | 11/2018 | Dahl et al. | |
| 2021/0125599 | A1 | 4/2021 | He | |
| 2022/0130418 | A1 * | 4/2022 | Piechowiak | G10L 25/21 |
| 2022/0189448 | A1 * | 6/2022 | Oosugi | G10K 11/17885 |
| 2022/0223133 | A1 * | 7/2022 | McCutcheon | G10K 11/17813 |

OTHER PUBLICATIONS

"International Application Serial No. PCT/EP2023/066134, Written Opinion dated Aug. 1, 2023", 6 pgs.

* cited by examiner

AUDIO SIGNAL PROCESSING METHOD AND SYSTEM FOR NOISE MITIGATION OF A VOICE SIGNAL MEASURED BY AN AUDIO SENSOR IN AN EAR CANAL OF A USER

BACKGROUND OF THE INVENTION

Field of the Invention

The present disclosure relates to audio signal processing and relates more specifically to a method and computing system for noise mitigation of a voice signal measured by at least two sensors.

The present disclosure finds an advantageous application, although in no way limiting, in wearable devices such as earbuds or earphones or smart glasses used to pick-up voice for a voice call established using any voice communicating device, or for voice commands.

Description of the Related Art

To improve picking up a user's voice signal in noisy environments, wearable devices like earbuds or earphones or smart glasses are typically equipped with different types of audio sensors such as microphones and/or accelerometers. These audio sensors are usually positioned such that at least one audio sensor, referred to as external sensor, picks up mainly air-conducted voice and such that at least another audio sensor, referred to as internal sensor, picks up mainly bone-conducted voice.

Compared to an external sensor, an internal sensor picks up the user's voice with less ambient noise but with a limited spectral bandwidth (mainly low frequencies), such that the bone-conducted voice provided by the internal sensor can be used to enhance the air-conducted voice provided by the external sensor, and vice versa.

In many existing solutions which use both an internal sensor and an external sensor, the audio signals provided by the internal sensor and the external sensor are not used simultaneously. Using only the audio signal from the external sensor in the output signal has the drawback that the output signal will generally contain more ambient noise, thereby e.g. increasing conversation effort in a noisy or windy environment for the voice call use case. Using only the audio signal from the internal sensor in the output signal has the drawback that the voice signal will generally be strongly low-pass filtered in the output signal, causing the user's voice to sound muffled thereby reducing intelligibility and increasing conversation effort. Some other existing solutions propose mixing the audio signals from the internal sensor and the external sensor by e.g. producing an output signal which corresponds mainly to the audio signal from the internal sensor in low frequencies and which corresponds mainly to the audio signal from the external sensor in high frequencies.

However, in most cases, the internal sensor may also pick-up non-negligible ambient noise.

For instance, if the wearable device is an earbud and if the internal sensor is an air conduction sensor (e.g. a microphone) to be located in an ear canal of the user of the earbud and arranged on the earbud towards the interior of the user's head, then the internal sensor will still pick-up ambient noise. This leaked ambient noise will disturb the voice pickup significantly if the ambient noise is loud, or when e.g. the earbud is not tightly fit in the user's ear canal. This is due to the fact that a reduced sealing of the ear canal increases ambient noise leakage and reduces bone conducted resonance (a.k.a. occlusion effect) in the internal sensor, therefore reducing the signal to noise ratio.

Hence, in such a case, using for the low frequencies (e.g. below 4000 Hz or below 2000 Hz) the audio signal provided by the internal sensor may not bring the expected benefits, regardless how said audio signal is used, since said audio signal may be affected by non-negligible ambient noise (although usually less than in the audio signal from the external sensor).

Audio signals from internal sensors may also be used for purposes other than mixing with audio signals from e.g. external sensors. For instance, audio signals from internal sensors may be used for voice activity detection (VAD), noise estimation, speech recognition, etc., which are also affected by the degradation of the signal to noise ratio due to e.g. ambient noise leakage.

Accordingly, there is a general need for a solution enabling to mitigate ambient noise in the audio signal provided by such an internal sensor.

SUMMARY OF THE INVENTION

The present disclosure aims at improving the situation. In particular, the present disclosure aims at overcoming at least some of the limitations of the prior art discussed above, by proposing a solution for mitigating ambient noise in an audio signal provided by an internal sensor as discussed above.

For this purpose, and according to a first aspect, the present disclosure relates to an audio signal processing method implemented by an audio system which comprises at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein the audio signal processing method comprises:

- producing a first audio signal and a second audio signal by measuring simultaneously acoustic signals reaching the internal sensor and acoustic signals reaching the external sensor, respectively,
- filtering the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal,
- mixing the filtered second audio signal and the first audio signal, thereby producing a denoised first audio signal.

Hence, the present disclosure uses the second audio signal from the external sensor to mitigate ambient noise in the first audio signal from the internal sensor. When the internal sensor picks up the ambient noise (noise acoustic signal originating from outside the user's head), then the corresponding first noise signal in the first audio signal is mainly air-conducted (vs. bone-conducted) in a frequency band composed mainly of low frequencies. For instance, in case or an earbud which is not tightly fit in the user's ear canal, then the first audio signal is mainly air-conducted in a frequency band composed of frequencies below 4000 hertz, or below 3000 hertz, or below 2000 hertz. Since the first noise signal and the second noise signal are both mainly air-conducted on this frequency band, they are coherent such that it is possible to define a linear noise matching filter that matches the second noise signal with the first noise signal on this frequency band. By "matching the second noise signal with the first noise signal", we mean that filtering the second noise signal by the noise matching filter yields substantially the first noise signal on the frequency band where they are coherent. Hence, the filtered second noise signal represents an estimate of the first noise signal, e.g. by approximating the amplitude and phase of the first noise signal.

In the presence of a voice acoustic signal in the acoustic signals measured by the internal sensor and the external sensor (i.e. when the user speaks), then the internal sensor produces a first voice signal which comprises both an air-conducted voice signal and a bone-conducted voice signal. However, the air-conducted voice signal corresponds to the voice acoustic signal reaching the internal sensor by following the same path as the ambient noise which reaches the internal sensor. Hence, the noise-matching filter tends also to match the second voice signal (i.e. voice acoustic signal reaching the external sensor via air-conduction) in the second audio signal with the air-conducted voice signal in the first audio signal. Hence, the filtered second audio signal comprises both:

- a filtered second noise signal, which matches substantially the first noise signal in the first audio signal, and
- a filtered second voice signal, which matches substantially the air-conducted voice signal in the first audio signal.

Accordingly, by mixing the filtered second audio signal and the first audio signal, e.g. by subtracting the filtered second audio signal to the first audio signal, it is possible to reduce the first noise signal and the air-conducted voice signal in the first audio signal, in order to keep mainly the bone-conducted voice signal affected only by little ambient noise. Of course, the noise mitigation performance will depend on the accuracy of the noise matching filter, i.e. on the extent to which it actually matches the second noise signal with the first noise signal.

In specific embodiments, the audio signal processing method may further comprise one or more of the following optional features, considered either alone or in any technically possible combination.

In specific embodiments, the noise matching filter is a static filter.

In specific embodiments, the noise matching filter is an adaptive filter.

In specific embodiments, the audio signal processing method further comprises detecting a user's voice activity and adapting the noise matching filter based on the detected user's voice activity.

In specific embodiments, the audio signal processing method further comprises detecting wind, and at least one among the following:

- adapting the noise matching filter based on the detected wind, and/or
- combining the filtered second audio signal and the first audio signal based on the detected wind.

In specific embodiments, the audio signal processing method further comprises estimating a noise level and adapting the noise matching filter based on the estimated noise level.

In specific embodiments, the audio signal processing method further comprises estimating a level of an echo in the first audio signal and/or in the second audio signal, said echo being caused by a speaker unit of the audio system, and at least one among the following:

- adapting the noise matching filter based on the estimated echo level, and/or
- combining the filtered second audio signal and the first audio signal based on the estimated echo level.

In specific embodiments, the audio signal processing method further comprises filtering the denoised first audio signal by a voice matching filter configured to match a first voice signal in the filtered first audio signal with a second voice signal in the second audio signal, wherein the first voice signal and the second voice signal correspond to a same voice acoustic signal emitted by the user, measured by respectively the internal sensor and the external sensor, thereby producing a filtered denoised first audio signal.

In specific embodiments, the voice matching filter is a static filter.

In specific embodiments, the voice matching filter is an adaptive filter.

In specific embodiments, the audio signal processing method further comprises at least one among the following:

- detecting a user's voice activity and adapting the voice matching filter based on the detected voice activity,
- detecting wind and adapting the noise matching filter based on the detected wind,
- estimating a noise level and adapting the noise matching filter based on the estimated noise level,
- estimating a level of an echo in the first audio signal and/or in the second audio signal, wherein said echo is caused by a speaker unit of the audio system, and adapting the noise matching filter based on the estimated echo level.

In specific embodiments, the audio signal processing method further comprises producing an output signal by using the denoised first audio signal below a cutoff frequency and using the second audio signal above the cutoff frequency.

According to a second aspect, the present disclosure relates to an audio system comprising at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein the internal sensor and the external audio sensor are configured to produce a first audio signal and a second audio signal by measuring simultaneously acoustic signals reaching the internal sensor and acoustic signals reaching the external sensor, respectively, wherein said audio system further comprises a processing circuit configured to:

- filter the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal,
- mix the filtered second audio signal and the first audio signal, thereby producing a denoised first audio signal.

According to a third aspect, the present disclosure relates to a non-transitory computer readable medium comprising computer readable code to be executed by an audio system comprising at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein said audio system further comprises a processing circuit, wherein said computer readable code causes said audio system to:

producing a first audio signal and a second audio signal by measuring simultaneously acoustic signals reaching the internal sensor and acoustic signals reaching the external sensor, respectively, filter the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal, mix the filtered second audio signal and the first audio signal, thereby producing a denoised first audio signal.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF EMBODIMENTS

As indicated above, the present disclosure relates inter alia to an audio signal processing method 20 for mitigating noise in audio signals.

Figure 1:
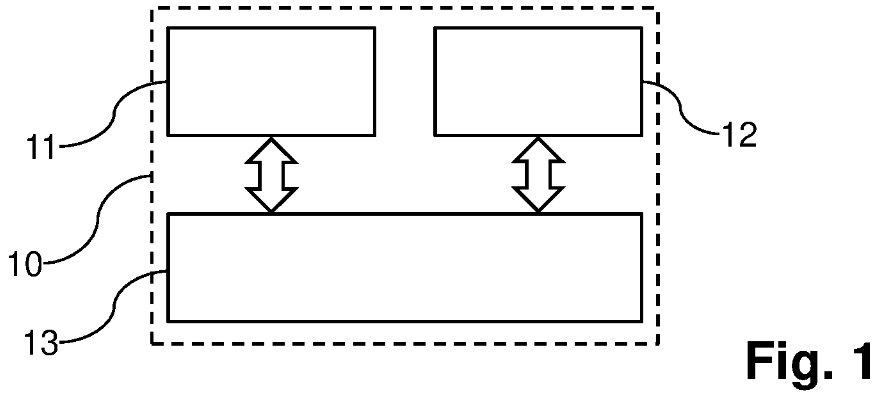
FIG. 1: a schematic representation of an exemplary embodiment of an audio system.

FIG. 1 represents schematically an exemplary embodiment of an audio system 10. In some cases, the audio system 10 is included in a device wearable by a user. In preferred embodiments, the audio system 10 is included in earbuds or in earphones or in smart glasses.

As illustrated by FIG. 1, the audio system 10 comprises at least two audio sensors which are configured to measure voice signals emitted by the user of the audio system 10.

One of the audio sensors is referred to as internal sensor 11. The internal sensor 11 is referred to as "internal" because it is arranged to measure voice acoustic signals which propagate internally through the user's head. For instance, the internal sensor 11 may be an air conduction sensor (e.g. microphone) to be located in an ear canal of a user and arranged on the wearable device towards the interior of the user's head, or a bone conduction sensor (e.g. accelerometer, vibration sensor). The internal sensor 11 may be any type of bone conduction sensor or air conduction sensor known to the skilled person.

The present disclosure finds an advantageous application, although non-limitative, to the case where the internal sensor 11 is an air conduction sensor. In the sequel, we assume in a non-limitative manner that the internal sensor 11 is an air conduction sensor, e.g. a microphone, to be located in an ear canal of a user and arranged towards the interior of the user's head.

The other audio sensor is referred to as external sensor 12. The external sensor 12 is referred to as "external" because it is arranged to measure voice acoustic signals which propagate externally to the user's head (via the air between the user's mouth and the external sensor 12). The external sensor 12 is an air conduction sensor (e.g. microphone) to be located outside the ear canals of the user, or to be located inside an ear canal of the user but arranged on the wearable device towards the exterior of the user's head, such that it produces air-conducted signals. The external sensor 12 may be any type of air conduction sensor known to the skilled person.

For instance, if the audio system 10 is included in a pair of earbuds (one earbud for each ear of the user), then the internal sensor 11 is for instance arranged in a portion of one of the earbuds that is to be inserted in the user's ear, while the external sensor 12 is for instance arranged in a portion of one of the earbuds that remains outside the user's ears. It should be noted that, in some cases, the audio system 10 may comprise two or more internal sensors 11 (for instance one or two for each earbud) and/or two or more external sensors 12 (for instance one for each earbud).

As illustrated by FIG. 1, the audio system 10 comprises also a processing circuit 13 connected to the internal sensor 11 and to the external sensor 12. The processing circuit 13 is configured to receive and to process the audio signals produced by the internal sensor 11 and the external sensor 12.

In some embodiments, the processing circuit 13 comprises one or more processors and one or more memories. The one or more processors may include for instance a central processing unit (CPU), a graphical processing unit (GPU), a digital signal processor (DSP), a field-programmable gate array (FPGA), an application specific integrated circuit (ASIC), etc. The one or more memories may include any type of computer readable volatile and non-volatile memories (magnetic hard disk, solid-state disk, optical disk, electronic memory, etc.). The one or more memories may store a computer program product (software), in the form of a set of program-code instructions to be executed by the one or more processors in order to implement all or part of the steps of an audio signal processing method 20.

Figure 2:
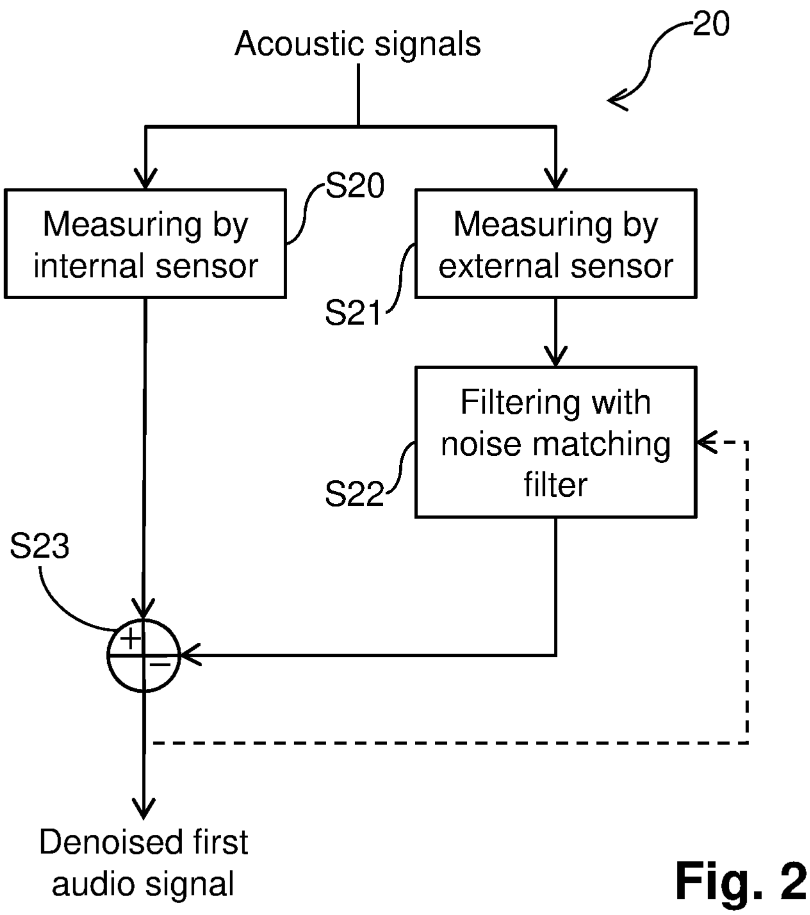
FIG. 2: a diagram representing the main steps of a first exemplary embodiment of an audio signal processing method.

FIG. 2 represents schematically the main steps of an exemplary embodiment of an audio signal processing method 20 for mitigating noise in audio signals, which are carried out by the audio system 10.

As illustrated by FIG. 2, the internal sensor 11 measures acoustic signals reaching said internal sensor 11, thereby producing a first audio signal (step S20). A voice acoustic signal emitted by the user of the audio system 10 reaches the internal sensor 11 at least via bone-conduction (by propagating internally through the user's head) and possibly also via air-conduction (by propagating externally to the user's head, in case of e.g. a loosely fit earbud). Acoustic signals originating outside the user's head (e.g. noise acoustic signal) reach the internal sensor 11 mainly via air-conduction through imperfect sealing (e.g. loosely fit earbud or presence of a vent in the earbud). Simultaneously, the external sensor 12 measures acoustics signals reaching said external sensor 12, thereby producing a second audio signal (step S21). Acoustic signals originating outside the user's head reach the external sensor 12 only via air-conduction (by propagating externally to the user's head). The acoustic signals reaching the internal sensor 11 and the external sensor 12 may or may not include a voice acoustic signal emitted by the user, with the presence of a voice activity varying over time as the user speaks.

As illustrated by FIG. 2, the audio signal processing method 20 comprises a step S22 of filtering the second audio signal by a noise matching filter configured to match a second noise signal affecting the second audio signal with a first noise signal affecting the first audio signal.

As discussed above, the internal sensor 11 may pick-up ambient noise (noise acoustic signal originating outside the user's head) when e.g. the earbud which includes the internal sensor 11 is not tightly fit in the user's ear canal. In such a case, the corresponding first noise signal in the first audio signal is mainly air-conducted (vs. bone-conducted) for low frequencies. The ambient noise measured by the external sensor 12 is referred to as second noise signal and is included in the second audio signal and is by nature air-conducted. Hence, for low frequencies at least, the first noise signal and the second noise signal are both mainly air-conducted and are therefore coherent for low frequencies such that it is possible to define a linear noise matching filter that matches the second noise signal with the first noise signal for low frequencies. By "matching the second noise signal with the first noise signal", we mean that filtering the second noise signal by the noise-matching filter yields substantially the first noise signal on a frequency band where they are coherent. In other words if we denote the first noise signal by $N_1$ and the second noise signal by $N_2$, then the noise matching filter $H_n$ is such that, at least for low frequencies:

$$N_1 \approx H_n * N_2$$

wherein * denotes the convolution operation.

It should be noted that the frequency band on which the first noise signal and the second noise signal are actually strongly coherent might depend on the configuration, e.g. on how much the earbud is tightly fit in the user's canal. This frequency band is typically composed of frequencies below 4000 hertz, or below 3000 hertz, or below 2000 hertz. Due to the fact that the internal sensor 11 is arranged to measure mainly bone-conducted acoustic signals, the audio signals it produces are typically used only on a limited spectral bandwidth, composed mainly of low frequencies since high frequency components are likely to correspond only to noise. Hence, the useful part of the first audio signal corresponds also to its low frequency components, typically below 4000 hertz, or below 3000 hertz, or below 2000 hertz. In other words, the first noise signal and the second noise signal are usually coherent in the useful spectral part of the first audio signal.

Hence, the filtered second noise signal $H_n * N_2$, also referred to as "matched second noise signal", represents an estimate of the first noise signal $N_1$, e.g. by approximating the amplitude and phase of the first noise signal $N_1$.

As illustrated by FIG. 2, the audio signal processing method 20 comprises a step S23 of mixing the filtered second audio signal and the first audio signal. The result of the mixing of the filtered second audio signal and the first audio signal is referred to as denoised first audio signal.

If we denote by $S_1$ the first audio signal then, when voice is present and the earbud is not tightly fit in the user's ear canal, we have:

$$S_1 = V_1 + N_1 = V_{1,a} + V_{1,b} + N_1$$

wherein $V_1$ is a first voice signal present in the first audio signal $S_1$, which comprises a bone-conducted voice signal $V_{1,b}$ and an air-conducted voice signal $V_{1,a}$. The first noise signal $N_1$, as discussed above, corresponds substantially to air-conducted ambient noise.

If we denote by $S_2$ the second audio signal then, when voice is present, we have:

$$S_2 = V_2 + N_2$$

wherein $V_2$ is a second voice signal present in the second audio signal $S_2$, which corresponds to air-conducted voice. The second noise signal $N_2$, as discussed above, corresponds to air-conducted ambient noise. The filtered second audio signal $S'_2$ is given by:

$$S'_2 = H_n * S_2 = H_n * V_2 + H_n * N_2$$

Since, both $V_{1,a}$ and $V_2$ are air-conducted, they are coherent in the useful spectral part of the first audio signal $S_1$ (low frequencies). Hence, for low frequencies at least, we also have:

$$V_{1,a} \approx H_n * V_2$$

Accordingly, mixing the first audio signal $S_1$ and the filtered second audio signal $S'_2$ may consist in subtracting the filtered second audio signal $S'_2$ to the first audio signal $S_1$:

$$S_1 - S'_2 = (V_{1,a} - H_n * V_2) + V_{1,b} + (N_1 - H_n * N_2) \approx V_{1,b}$$

Hence, provided $V_{1,a} \approx H_n * V_2$ and $N_1 \approx H_n * N_2$, mixing the first audio signal $S_1$ and the filtered second audio signal $S'_2$ denoises the first audio signal $S_1$ and yields a denoised first audio signal which corresponds substantially to $V_{1,b}$, i.e. to the bone-conducted voice signal in the first audio signal $S_1$.

Other mixing methods may be used during step S23. For instance, it is possible to perform a weighted subtraction of the filtered second audio signal, with weighting factors which may be adjusted based on operating conditions of the audio system 10.

In some embodiments, the noise matching filter may be a predetermined static filter. Hence, in such embodiments, the static noise matching filter is determined beforehand, e.g. based on training audio signals which may include for instance a plurality of pairs of a first audio signal and a second audio signal. The static noise matching filter may be determined to produce filtered second audio signals which reduce on average the power of the first noise signals in the first audio signals. Such a static noise matching filter remains unchanged over time. In some embodiments, it is possible to predetermine a plurality of static noise matching filters which are adapted to respective noise scenarios. In such a case, the static noise matching filter to be used may be selected based on a noise scenario determination which may be carried out e.g. based on the first audio signal and/or based on the second audio signal, preferably when there is no user voice activity.

In preferred embodiments, the noise matching filter is an adaptive filter, i.e. a filter which is modified dynamically based on the first audio signal and the second audio signal to improve dynamically the matching between the filtered second noise signal and the first noise signal. In the non-limitative example illustrated by FIG. 2, the noise matching filter is an adaptive filter which is adapted based on a result of a comparison between the filtered second audio signal and the first audio signal. In the non-limitative example of FIG. 2, the mixing corresponds to a subtraction of the filtered second audio signal to the first audio signal. Such a mixing therefore compares the filtered second audio signal and the first audio signal and the result of the mixing (i.e. the denoised first audio signal) can be used to dynamically adapt the noise matching filter, as illustrated by FIG. 2. In some cases, the adaptation of the noise matching filter aims at minimizing the power of its output error, which corresponds to the denoised first audio signal in the absence of voice activity.

For instance, the adaptive noise matching filter may be a least mean square, LMS, filter or a normalized LMS, NLMS, filter. However, other types of adaptive filters known to the skilled person may be used in the present disclosure, and the choice of a specific type of adaptive filter corresponds to a specific and non-limitative embodiment of the present disclosure.

In some embodiments, when an adaptive noise matching filter is used, a high-pass filter may be applied beforehand to both the first audio signal and the second audio signal, to mainly cancel or reduce the DC component. For instance, this high-pass filter may have a cutoff frequency around 50 Hz, such that the frequency components below 50 Hz are filtered out while the frequency components above 50 Hz are kept in the first and second audio signals.

Figure 3:
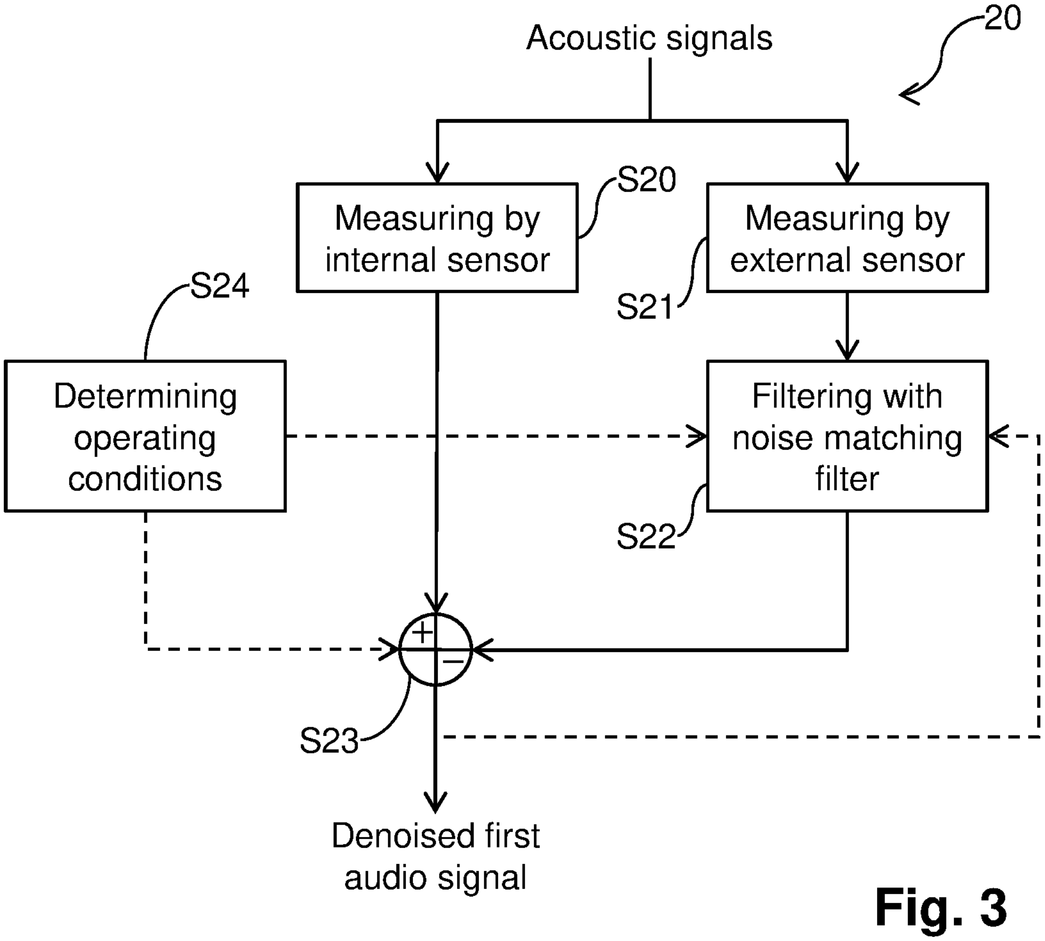
FIG. 3: a diagram representing the main steps of a second exemplary embodiment of the audio signal processing method.

FIG. 3 represents schematically the main steps of a preferred embodiment of the audio signal processing method 20. In addition to the steps described above in reference to FIG. 2, the audio signal processing method 20 comprises a step S24 of determining operating conditions of the audio system 10. The determined operating conditions are then used to control the filtering of the second audio signal and/or to control the mixing of the filtered second audio signal with the first audio signal, as illustrated by FIG. 3.

In the sequel, we assume in a non-limitative manner that the noise matching filter is an adaptive filter. However, the embodiments described in reference to FIG. 3 can also be applied, in some cases, with one or more static noise matching filters.

In some embodiments, determining the operating conditions includes determining whether or not the first and second audio signals include a voice signal, in particular the user's voice. In other words, the audio system 10 detects voice activity in the acoustic signals measured by the internal sensor 11 and by the external sensor 12. Such a voice activity detection may be carried out in a conventional manner using any voice activity detection method known to the skilled person, for instance by using the first audio signal and/or, preferably, the second audio signal.

Preferably, the adaptive noise matching filter is controlled based on the detected voice activity. For instance, it is possible to adapt the noise matching filter only when no voice activity is detected. Indeed, ensuring that the adaptation is carried out only when no voice is present, i.e. when the first audio signal and the second audio signal correspond substantially to noise, ensures that the adaptation will indeed try to match the second noise signal with the first noise signal (the noise signals are the useful signals for the adaptive noise matching filter) without considering other non-useful signals such as voice. According to another example, it is possible to control an adaptation speed of the adaptive noise matching filter. For instance, it is possible to use a faster adaptation speed when no voice activity is detected than when a voice activity is detected, such that the adaptive noise matching filter changes slowly when a voice activity is detected in the first and second audio signals.

In some embodiments, determining the operating conditions includes determining whether or not the first and second audio signals are affected by wind. In other words, the audio system 10 detects the presence of wind when measuring acoustic signals by the internal sensor 11 and by the external sensor 12. Such a wind detection may be carried out in a conventional manner using any wind detection method known to the skilled person, for instance by using the first audio signal and/or, preferably, the second audio signal.

Preferably, the adaptive noise matching filter is controlled based on the detected wind. For instance, it is possible to adapt the noise matching filter only when no wind is detected. Indeed, unlike ambient noise, the wind noise is not coherent in the first and second audio signals, such that the noise matching filter should not be adapted in the presence of wind (since it will try to adapt to non-coherent audio signals) or should be adapted much slower in the presence of wind. Alternatively or in combination thereof, it is also possible to control the mixing of the filtered second audio signal with the first audio signal based on the detected wind. For instance, it is possible to decrease or even cancel the contribution of the filtered second audio signal when wind is detected, by e.g. applying a weighting factor to the filtered second audio signal:

$$S_1-\alpha_2\times S'_2$$

wherein $0\leq\alpha_2\leq 1$ is the weighting factor the value of which can be adjusted based on the detected wind. Typically, the value of $\alpha_2$ is reduced when wind is detected and may be even set to zero to cancel the contribution of the filtered second audio signal, for instance in the presence of strong wind. Indeed, wind noise affects mainly the second audio signal such that mixing the filtered second audio signal with the first audio signal in the presence of wind would mainly result in increasing the wind noise level in the first audio signal.

In some embodiments, determining the operating conditions includes estimating a noise level in the acoustic signals measured by the internal sensor 11 and by the external sensor 12. Such a noise level estimation may be carried out in a conventional manner using any noise level estimation method known to the skilled person, for instance by using the first audio signal and/or, preferably, the second audio signal.

Preferably, the adaptive noise matching filter is controlled based on the estimated noise level. For instance, it is possible to adapt the noise matching filter only when the estimated noise level is high, e.g. when it is above a predetermined threshold. Indeed, ensuring that the adaptation is carried out only when the noise level is high ensures that the adaptation will indeed try to match the second noise signal with the first noise signal when they are strongly coherent (the noise signals are the useful signals for the adaptive noise matching filter). According to another example, it is possible to control an adaptation speed of the adaptive noise matching filter. For instance, it is possible to use a faster adaptation speed when the estimated noise level is high than when the estimated noise level is low, such that the adaptive noise matching filter changes slowly when the estimated noise level is low.

In some embodiments, determining the operating conditions includes estimating an echo level in the first audio signal and/or in the second audio signal. Indeed, the audio system 10, for instance earbuds, typically includes one or more speaker units (not represented in the figures) for outputting acoustic signals to the user. The internal sensor 11 (and possibly the external sensor 12) also picks up these acoustic signals which may include e.g. voice from another person involved in a voice call with the user of the audio system 10. Such an echo level estimation may be carried out in a conventional manner using any echo level estimation method known to the skilled person, for instance by comparing the first audio signal with the audio signal converted into acoustic signals by the speaker unit.

Preferably, the adaptive noise matching filter is controlled based on the estimated echo level. For instance, it is possible to adapt the noise matching filter only when the estimated echo level is low, e.g. when it is below a predetermined threshold. Indeed, ensuring that the adaptation is carried out only when the estimated echo level is low ensures that the adaptation will indeed try to match the second noise signal with the first noise signal (the noise signals are the useful signals for the adaptive noise matching filter) without considering other non-useful signals such as voice from another person. According to another example, it is possible to control an adaptation speed of the adaptive noise matching filter based on the estimated echo level. For instance, it is possible to use a faster adaptation speed when the estimated echo level is low than when the estimated echo level is high, such that the adaptive noise matching filter changes slowly when the estimated echo level is high. Alternatively or in combination thereof, it is possible to control the mixing of the filtered second audio signal with the first audio signal based on the estimated echo level. For instance, it is possible to decrease or even cancel the contribution of the filtered second audio signal when the estimated echo level in the second audio signal is high compared to the estimated echo level in the first audio signal, by e.g. applying a weighting factor to the filtered second audio signal:

$$S_1-\beta_2\times S'_2$$

wherein $0\leq\beta_2\leq 1$ is the weighting factor the value of which can be adjusted based on the estimated echo level. Typically, the value of $\beta_2$ is reduced when the estimated echo level in the second audio signal is high compared to the estimated echo level in the first audio signal and may be even set to zero to cancel the contribution of the filtered second audio signal, for instance in the presence of strong echo.

Several examples of operating conditions which can be determined to control the noise matching filter and/or the mixing have been provided hereinabove, and include the voice activity (in particular the voice activity of the user of the audio system 10), the presence of wind, the noise level, the echo level, etc. Depending on the embodiments, it is possible to consider only one of these examples of operating conditions (e.g. by evaluating only the voice activity), or any combination thereof (by evaluating two or more of these examples of operating conditions, for instance by evaluating both the voice activity and the presence of wind, etc.).

Figure 4:
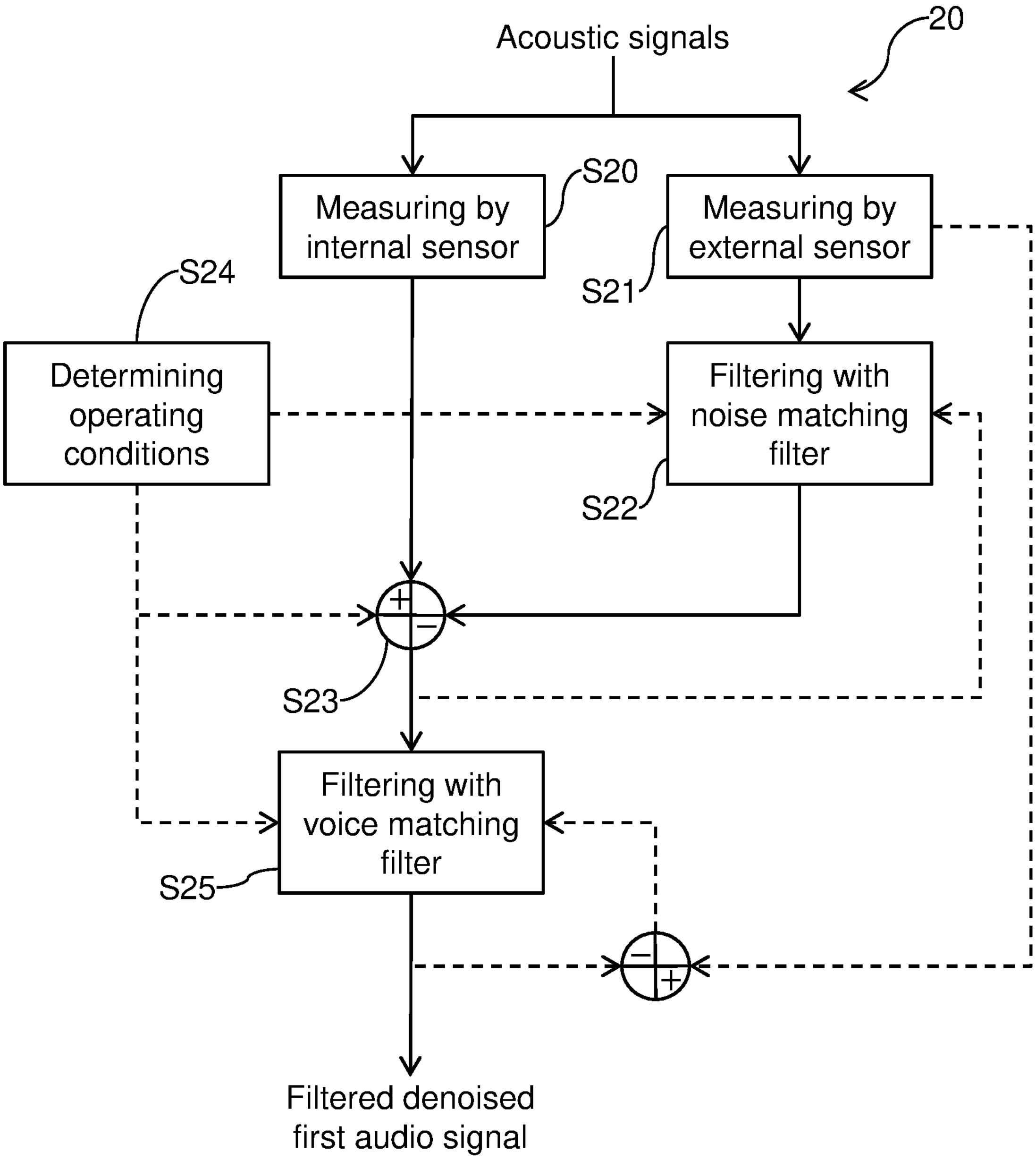
FIG. 4: a diagram representing the main steps of a third exemplary embodiment of the audio signal processing method.

FIG. 4 represents schematically a preferred embodiment of the audio signal processing method 20. In addition to the steps described above in reference to FIG. 3, the audio signal processing method 20 comprises a step S25 of filtering the denoised first audio signal by a voice matching filter. It should be noted that the embodiment in FIG. 4 can also be implemented without the step S24 of determining the operating conditions.

Indeed, as discussed above, in the presence of the user's voice in the first audio signal and in the second audio signal, the output of the mixing (e.g. subtraction) should mainly correspond to a bone-conducted voice signal $V_{1,b}$:

$$S_1-S'_2=(V_{1,a}-H_n*V_2)+V_{1,b}+(N_1-H_n*N_2)\approx V_{1,b}$$

However, bone-conducted voice signals do not sound very natural (and the denoised first audio signal may also comprise residues of the second voice signal $V_2$ and of the air-conducted voice signal $V_{1,a}$).

Hence, the purpose of the voice matching filter is to make the denoised first audio signal sound more natural, in particular to make the denoised first audio signal sound more like air-conducted voice in the presence of the user's voice in the first audio signal and in the second audio signal. The voice matching filter is therefore configured to match a first voice signal in the denoised first audio signal (i.e. mainly the bone-conducted voice signal $V_{1,b}$) with the second voice signal $V_2$ (air-conducted) in the second audio signal. The output of the filtering by the voice matching filter is referred to as filtered denoised first audio signal. By "matching the first voice signal with the second voice signal", we mean that filtering the first voice signal by the voice matching filter yields substantially the second voice signal.

As for the noise matching filter, the voice matching filter may be a predetermined static filter. Hence, in such embodiments, the static voice matching filter is determined beforehand, by using any supervised system identification method known to the skilled person, for instance Wiener filter identification relying on ambient noise and own-voice spatial statistics. This can be done if we assume that the own-voice spatial properties do not vary much, which is the case if the earbud sits in the ear without changing position.

In preferred embodiments, the voice matching filter is an adaptive filter, i.e. a filter which is modified dynamically based on the denoised first audio signal and the second audio signal to improve dynamically the matching between the first voice signal and the second voice signal. In the non-limitative example illustrated by FIG. 4, the voice matching filter is an adaptive filter which is adapted based on a result of a comparison (difference) between the filtered denoised first audio signal and the second audio signal. In some cases, the adaptation of the voice matching filter aims at minimizing the power of its output error which corresponds to the difference between the filtered denoised first audio signal and the second audio signal in the presence of voice activity.

For instance, the adaptive voice matching filter may be an LMS or NLMS filter. However, other types of adaptive filters known to the skilled person may be used in the present disclosure, and the choice of a specific type of adaptive filter corresponds to a specific and non-limitative embodiment of the present disclosure.

In the non-limitative example of FIG. 4, the audio signal processing method 20 comprises the step S24 of determining the operating conditions of the audio system 10, which includes determining whether or not the first and second audio signals include the user's voice. As discussed above for the noise matching filter (and regardless of whether or not the noise matching filter is adapted based on the detected voice activity), in preferred embodiments, the adaptive voice matching filter may be controlled based on the detected voice activity. For instance, it is possible to adapt the voice matching filter only when voice activity is detected. Indeed, ensuring that the adaptation is carried out only when voice is present ensures that the adaptation will indeed try to match the first voice signal with the second voice signal (these voice signals are the useful signals for the adaptive voice matching filter) without focusing too much on other non-useful signals such as noise. According to another example, it is possible to control an adaptation speed of the adaptive voice matching filter. For instance, it is possible to use a faster adaptation speed when a voice activity is detected than when no voice activity is detected, such that the adaptive voice matching filter changes slowly when the user's voice is absent.

As for the noise matching filter, other operating conditions may be considered for adapting the voice matching filter. For instance, the voice matching filter may be adapted based on:

- the detected user's voice activity (by e.g. adapting the voice matching filter only when voice activity is detected, etc.), and/or
- the detected wind (by e.g. adapting the voice matching filter only when no wind is detected, etc.), and/or
- the estimated noise level (by e.g. adapting the voice matching filter only when the estimated noise level is low, etc.), and/or,
- the estimated echo level (by e.g. adapting the voice matching filter only when the estimated echo level is low, etc.).

Hence, the proposed audio signal processing method 20 denoises the first audio signal from the internal sensor 11 by using the second audio signal from the external sensor 12 filtered by a noise matching filter. This noise matching filter enables to reduce the ambient noise in the first audio signal at least on the frequency band where the first noise signal and the second noise signal are coherent (mainly low frequencies). Hence, as such the denoised first audio signal (optionally filtered by the voice matching filter) is an enhanced version of the first audio signal, which may be used to improve the performance of different applications, including the applications which may use only the first audio signal from the internal sensor (e.g. speech recognition, etc.).

Figure 5:
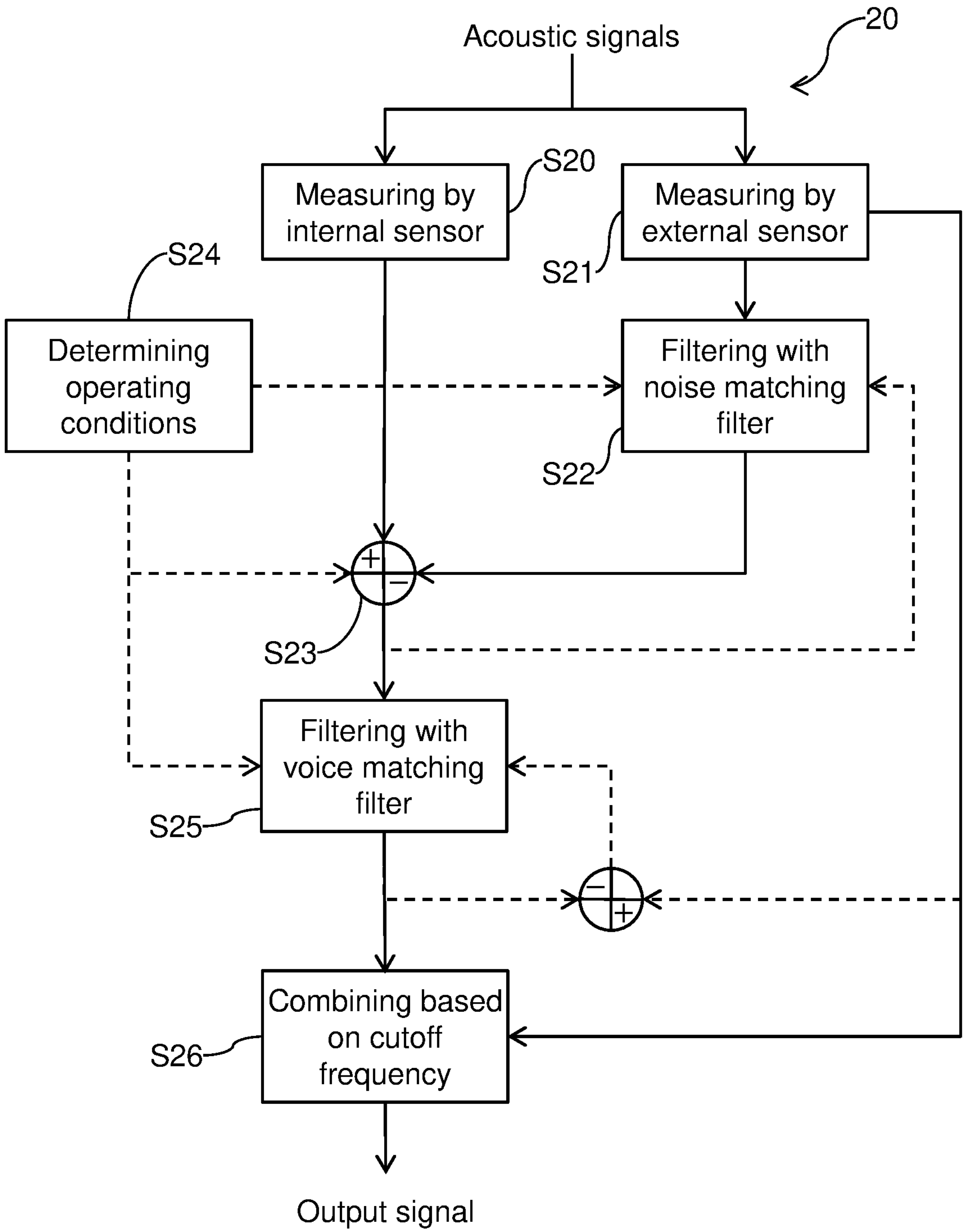
FIG. 5: a diagram representing the main steps of a fourth exemplary embodiment of the audio signal processing method.

FIG. 5 represents schematically the main steps of a preferred embodiment of the audio signal processing method 20, in which the denoised first audio signal (optionally filtered by the voice matching filter) and the second audio signal are combined (step S26) to produce an output signal. For instance, the output signal is obtained by using the denoised first audio signal below a cutoff frequency and using the second audio signal above the cutoff frequency. Typically, the output signal is obtained by:

- low-pass filtering the denoised first audio signal (optionally filtered by the voice matching filter) based on the cutoff frequency,
- high-pass filtering the second audio signal based on the cutoff frequency,
- adding the respective results of the low-pass filtering of the denoised first audio signal and of the high-pass filtering of the second audio signal to produce the output signal.

For instance, the cutoff frequency may be a static frequency, which is preferably selected beforehand in the frequency band in which the first noise signal and the second noise signal are expected to be coherent.

According to another example, the cutoff frequency may be dynamically adapted to the actual noise conditions. For instance, the setting of the cutoff frequency may use the method described in U.S. patent application Ser. No. 17/667,041, filed on Feb. 8, 2022, the contents of which are hereby incorporated by reference in its entirety.

It is emphasized that the present disclosure is not limited to the above exemplary embodiments. Variants of the above exemplary embodiments are also within the scope of the present invention.

For instance, the present disclosure has been described by considering mainly one internal sensor 11 and one external sensor 12.

As discussed above, the present disclosure can also be applied when the audio system 10 comprises two or more internal sensors 11 and/or two or more external sensors 12. If the audio system 10 comprises two or more internal sensors 11, then it is possible to denoise all the internal sensors 11 as discussed hereinabove, or only some of them. Each denoised internal sensor 11 may use its own noise matching filter. If the audio system 10 comprises two or more external sensors 12, then it is possible to use only one external sensor 12 to denoise an internal sensor 11. For instance, in case of a pair earbuds wherein each earbud comprises at least one internal sensor 11 and at least one external sensor 12, an internal sensor 11 is preferably denoised by using the external sensor 12 that is included in the same earbud as the considered internal sensor 11. It is also possible to combine audio signals produced by different external sensors 12, in which case the second audio signal discussed hereinabove may correspond to a combination of audio signals produced by different external sensors 12. The combination may vary depending on where the second audio signal is used. For instance, when used for denoising a first audio signal, the combination may be any combination emphasizing the second noise signal (since the second noise signal corresponds to the useful signal for the noise matching filter). In turn, when used for adapting the voice matching filter and/or to produce an output signal during step S26, the combination may be any combination emphasizing the second voice signal (since the second voice signal corresponds to the useful signal in these cases).

The invention claimed is:

1. An audio signal processing method implemented by an audio system which comprises at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein the audio signal processing method comprises:

producing a first audio signal and a second audio signal by measuring simultaneously acoustic signals reaching the internal sensor and acoustic signals reaching the external sensor, respectively, filtering the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal, mixing the filtered second audio signal and the first audio signal, thereby producing a denoised first audio signal, and filtering the denoised first audio signal by a voice matching filter configured to match a first voice signal in the denoised first audio signal with a second voice signal in the second audio signal, wherein the first voice signal and the second voice signal correspond to a same voice acoustic signal emitted by the user, measured by respectively the internal sensor and the external sensor, thereby producing a filtered denoised first audio signal.

2. The audio signal processing method according to claim 1, wherein the noise matching filter is an adaptive filter.

3. The audio signal processing method according to claim 2, further comprising detecting a user's voice activity and adapting the noise matching filter based on the detected user's voice activity.

4. The audio signal processing method according to claim 2, further comprising detecting wind, and at least one among the following:

adapting the noise matching filter based on the detected wind, combining the filtered second audio signal and the first audio signal based on the detected wind.

5. The audio signal processing method according to claim 2, further comprising estimating a noise level and adapting the noise matching filter based on the estimated noise level.

6. The audio signal processing method according to claim 2, further comprising estimating a level of an echo in the first audio signal and/or in the second audio signal, wherein said echo is caused by a speaker unit of the audio system, and at least one among the following:

adapting the noise matching filter based on the estimated echo level, combining the filtered second audio signal and the first audio signal based on the estimated echo level.

7. The audio signal processing method according to claim 1, wherein the voice matching filter is an adaptive filter.

8. The audio signal processing method according to claim 7, further comprising at least one among the following:

detecting a user's voice activity and adapting the voice matching filter based on the detected voice activity, detecting wind and adapting the noise matching filter based on the detected wind, estimating a noise level and adapting the noise matching filter based on the estimated noise level, estimating a level of an echo in the first audio signal and/or in the second audio signal, wherein said echo is caused by a speaker unit of the audio system, and adapting the noise matching filter based on the estimated echo level.

9. The audio signal processing method according to claim 1, further comprising producing an output signal by using the denoised first audio signal below a cutoff frequency and using the second audio signal above the cutoff frequency.

10. An audio system comprising at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein the internal sensor and the external audio sensor are configured to produce a first audio signal and a second audio signal by measuring simultaneously acoustic signals reaching the internal sensor and acoustic signals reaching the external sensor, respectively, wherein said audio system further comprises a processing circuit configured to:

filter the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal, mix the filtered second audio signal and the first audio signal, thereby producing a denoised first audio signal, and filter the denoised first audio signal by a voice matching filter configured to match a first voice signal in the denoised first audio signal with a second voice signal in the second audio signal, wherein the first voice signal and the second voice signal correspond to a same voice acoustic signal emitted by the user, measured by respectively the internal sensor and the external sensor, thereby producing a filtered denoised first audio signal.

11. The audio system according to claim 10, wherein the noise matching filter is an adaptive filter.

12. The audio system according to claim 11, wherein the processing circuit is further configured to detect a user's voice activity and to adapt the noise matching filter based on the detected voice activity.

13. The audio system according to claim 11, wherein the processing circuit is further configured to detect wind, and to perform at least one among the following:

adapt the noise matching filter based on the detected wind, combine the filtered second audio signal and the first audio signal based on the detected wind.

14. The audio system according to claim 11, wherein the processing circuit is further configured to estimate a noise level and to adapt the noise matching filter based on the estimated noise level.

15. The audio system according to claim 11, further comprising a speaker unit, wherein the processing circuit is further configured to estimate a level of an echo in the first audio signal and/or in the second audio signal, wherein said echo is caused by the speaker unit, and to perform at least one among the following:

adapt the noise matching filter based on the estimated echo level, combine the filtered second audio signal and the first audio signal based on the estimated echo level.

16. The audio system according to claim 10, wherein the voice matching filter is an adaptive filter.

17. The audio system according to claim 16, wherein the processing circuit is further configured to perform at least one among the following:

detecting a user's voice activity and adapting the voice matching filter based on the detected user's voice activity, detecting wind and adapting the noise matching filter based on the detected wind, estimating a noise level and adapting the noise matching filter based on the estimated noise level, estimating a level of an echo in the first audio signal and/or in the second audio signal, wherein said echo is caused by a speaker unit of the audio system, and adapting the noise matching filter based on the estimated echo level.

18. The audio system according to claim 10, wherein the processing circuit is further configured to produce an output signal by using the denoised first audio signal below a cutoff frequency and using the second audio signal above the cutoff frequency.

19. A non-transitory computer readable medium comprising computer readable code to be executed by an audio system comprising at least two sensors which include an internal sensor and an external sensor, wherein the internal sensor is arranged to measure acoustic signals which reach the internal sensor by propagating internally to a head of a user of the audio system and the external sensor is arranged to measure acoustic signals which reach the external sensor by propagating externally to the user's head, wherein said audio system further comprises a processing circuit, wherein said computer readable code causes said audio system to:

produce a first audio signal and a second audio signal by measuring simultaneously acoustic signals reaching the internal sensor and acoustic signals reaching the external sensor, respectively, filter the second audio signal by a noise matching filter configured to match a second noise signal affecting the second audio signal with a first noise signal affecting the first audio signal, wherein the first noise signal and the second noise signal correspond to a same noise acoustic signal originating outside the user's head and measured by respectively the internal sensor and the external sensor, thereby producing a filtered second audio signal which includes a matched second noise signal, mix the filtered second audio signal and the first audio signal, thereby producing a denoised first audio signal, and filter the denoised first audio signal by a voice matching filter configured to match a first voice signal in the denoised first audio signal with a second voice signal in the second audio signal, wherein the first voice signal and the second voice signal correspond to a same voice acoustic signal emitted by the user, measured by respectively the internal sensor and the external sensor, thereby producing a filtered denoised first audio signal.

20. The non-transitory computer readable medium according to claim 19, wherein the voice matching filter is an adaptive filter.

21. The non-transitory computer readable medium according to claim 20, wherein said computer readable code causes said audio system to perform at least one among the following:

detect a user's voice activity and adapt the voice matching filter based on the detected user's voice activity, detect wind and adapt the noise matching filter based on the detected wind, estimate a noise level and adapt the noise matching filter based on the estimated noise level, estimate a level of an echo in the first audio signal and/or in the second audio signal, wherein said echo is caused by a speaker unit of the audio system, and adapt the noise matching filter based on the estimated echo level.

* * * * *